United States Patent  (10) Patent No.: US 12,059,975 B2
Sikorski                   (45) Date of Patent:      Aug. 13, 2024

(54) ELECTRIC REGENERATIVE BRAKING SYSTEM

(71) Applicant: HIT THE BRAKES, LLC, Avon, OH (US)

(72) Inventor: Robert Sikorski, New Franklin, OH (US)

(73) Assignee: HIT THE BRAKES, LLC

( * ) Notice: Subject to any disclaimer, the term of this patent is extended or adjusted under 35 U.S.C. 154(b) by 126 days.

(21) Appl. No.: 18/052,364

(22) Filed: Nov. 3, 2022

(65) Prior Publication Data

US 2024/0149698 A1     May 9, 2024

(51) Int. Cl.
*B60L 7/22*        (2006.01)
*B60L 53/00*      (2019.01)
(Continued)

(52) U.S. Cl.
CPC ............ *B60L 7/22* (2013.01); *B60L 53/00* (2019.02); *B60L 58/25* (2019.02); *H01M 10/4264* (2013.01); *H01M 10/46* (2013.01); *H02P 3/14* (2013.01); *B60L 2240/12* (2013.01); *B60L 2240/545* (2013.01); *B60L 2260/26* (2013.01); *H01M 2220/20* (2013.01)

(58) Field of Classification Search
CPC .. B60L 7/22; B60L 53/00; B60L 58/25; B60L 2240/12; B60L 2240/545; B60L 2260/26; H01M 10/4264; H01M 10/46; H01M 2220/20; H02P 3/14
USPC ........................................ 318/376, 375, 362
See application file for complete search history.

(56) References Cited

U.S. PATENT DOCUMENTS 5,486,018 A     1/1996  Sakai
7,486,036 B2 *  2/2009  Oyobe ............ B60W 30/18127
                                                    318/63
(Continued)

FOREIGN PATENT DOCUMENTS

CN      203377351 U      1/2014
DE    102009001357 A1    9/2010
EP         2196338       10/2011

OTHER PUBLICATIONS

International Search Report for corresponding PCT application PCT/US2014/030595, Aug. 21, 2014.

*Primary Examiner* — David Luo
(74) *Attorney, Agent, or Firm* — Renner, Otto, Boisselle & Sklar, LLP

(57) ABSTRACT

An electric regenerative braking system is provided for capturing kinetic energy as electrical potential energy during vehicle braking (also referred to as a braking event). The electric regenerative braking system captures the kinetic energy from a shaft of the vehicle using an electric motor to generate electrical potential energy from the kinetic energy. The generated electrical potential energy is supplied to an energy accumulator that increases in electrical resistance as more electrical potential energy is stored. The electrical potential energy stored in the energy accumulator is used to charge a battery. The electric regenerative braking system uses a controller having a variable resistor to control a braking torque of the electric motor. That is, the controller modulates a resistance of the variable resistor based on the resistance of the energy accumulator, such that the resistance of the variable resistor is reduced as the resistance of the energy accumulator increases.

25 Claims, 2 Drawing Sheets

(51) Int. Cl.
  *B60L 58/25* (2019.01)
  *H01M 10/42* (2006.01)
  *H01M 10/46* (2006.01)
  *H02P 3/14* (2006.01)

(56) References Cited

U.S. PATENT DOCUMENTS

| | | |
|---|---|---|
| 8,038,230 B2 | 10/2011 | Nakamura |
| 2008/0087479 A1 | 4/2008 | Kang |
| 2012/0168242 A1 | 7/2012 | Kulatunga |

* cited by examiner

ELECTRIC REGENERATIVE BRAKING SYSTEM

TECHNICAL FIELD

The present disclosure relates generally to regenerative braking and more particular to electric regenerative braking.

BACKGROUND

Standard non-regenerative vehicle brakes dissipate kinetic energy as heat during braking. Regenerative braking systems recover a portion of the kinetic energy lost during braking using an electric motor that operates as a generator to restore power to a battery.

SUMMARY

Electric regenerative braking systems are unable to recover portions of the kinetic energy lost during braking due to charging limits of electric batteries. That is, while regenerative braking system are able to convert kinetic energy to electricity during braking, the amount of kinetic energy converted to electricity and stored in batteries is limited because batteries charge (i.e., take up electricity) at a much slower rate than electricity is generated during braking. For this reason, during a typical stop vehicles cannot rely on regenerative braking to stop the vehicle, because regenerative braking generates more electricity than can be taken up by the batteries. Instead, vehicles with regenerative braking rely on standard foundational brakes to absorb much of the kinetic energy during stopping, which is removed from the foundational brakes as heat.

The present disclosure provides an electric regenerative braking system for capturing kinetic energy as electrical potential energy during vehicle braking using (1) an electric motor to supply the electrical potential energy to (2) an energy accumulator that increases in electrical resistance as more electrical potential energy is stored and that provides the electrical potential energy to (3) a battery, and (4) an electronic controller including a variable resistor for controlling a braking torque of the electric motor based on the resistance of the variable resistor and the resistance of the energy accumulator.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the many ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
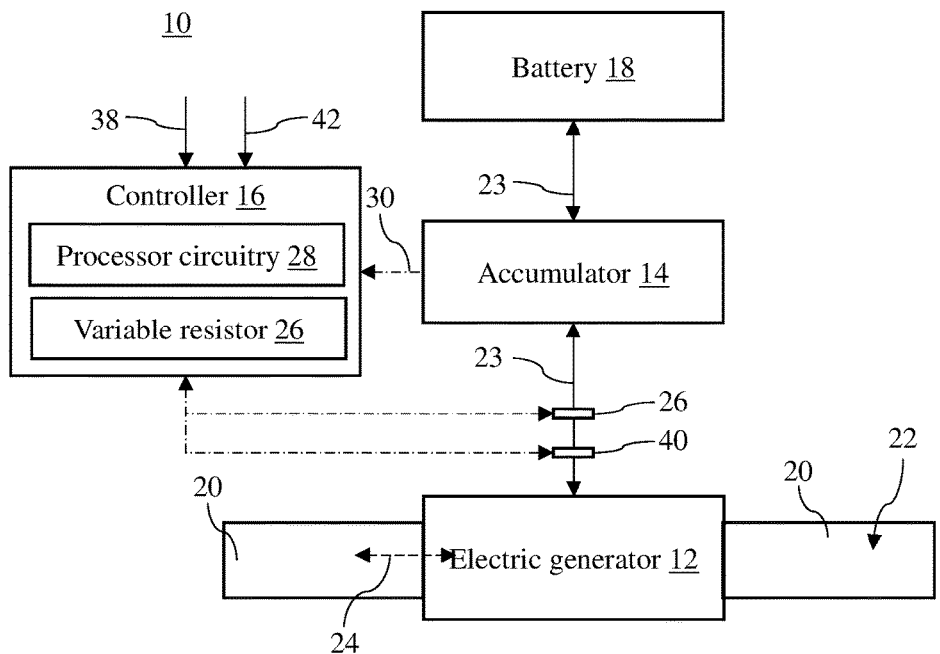
FIG. 1 illustrates a block diagram of an exemplary electric regenerative braking system.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides an electric regenerative braking system for capturing kinetic energy as electrical potential energy during vehicle braking (also referred to as a braking event). The electric regenerative braking system captures the kinetic energy from a shaft (e.g., the drive shaft) of the vehicle using an electric motor to generate electrical potential energy from the kinetic energy. The generated electrical potential energy is supplied to an energy accumulator that increases in electrical resistance as more electrical potential energy is stored. The electrical potential energy stored in the energy accumulator is used to charge a battery. The electric regenerative braking system uses a controller having a variable resistor to control a braking torque of the electric motor. That is, the controller modulates a resistance of the variable resistor based on the resistance of the energy accumulator, such that the resistance of the variable resistor is reduced as the resistance of the energy accumulator increases.

In the exemplary embodiment of FIG. 1, an electric regenerative braking system 10 is shown including an electric generator 12, an energy accumulator (also referred to as an electrical energy accumulator) 14, a controller 16, and a battery 18. The electric generator 12 (also referred to as an electric motor) is mechanically connected to the shaft 20 of the vehicle 22 and decelerates the vehicle 22 during a braking event by applying braking torque 24 to the shaft 20. The electric generator 12 also generates electrical potential energy 23 from kinetic energy (also referred to as torque) received from the shaft 20 during the braking event.

The energy accumulator 14 is electrically connected to the electric generator 12 and the battery 18. The energy accumulator 14 receives and stores the electrical potential energy 23 generated by the electric generator 12 during the braking event, such that the electrical potential energy 23 is increased in the energy accumulator 14. The energy accumulator 14 also charges the battery 18 using the stored electrical potential energy 23. The resistance of the energy accumulator 14 increases as the electrical potential energy stored by the energy accumulator increases.

The controller 16 includes a variable resistor 26 and processor circuitry 28. The processor circuitry 28 modulates a resistance of the variable resistor 26 to control the braking torque 24 of the electric generator 12 (e.g., so that the braking torque remains consistent). That is, the braking torque 24 of the electric generator 12 is determined based on the resistance of the energy accumulator 14 and the resistance of the variable resistor 26. To control the braking torque 24, the processor circuitry 28 receives the resistance 30 of the energy accumulator 14 at a current time point. The processor circuitry 28 controls the braking torque 24 of the electric generator 12 by modulating the resistance of the variable resistor 26 based on the resistance 30 of the energy accumulator 14 at the current time point, such that the resistance of the variable resistor 26 is reduced as the resistance of the energy accumulator increases. The variable resistor 26 may be any suitable device capable of changing electrical resistance in a controlled manner.

The processor circuitry 28 may control the resistance of the variable resistor 26 in proportion to the resistance of the energy accumulator 14. For example, the variable resistor 26 may be positioned in series with the energy accumulator 14, such that the electrical resistance experienced by the electric generator 12 is a sum of the electrical resistance of the variable resistor 26 and the electrical resistance of the energy accumulator 14. For this reason, the resistance of the variable resistor 26 may be inversely related to the resistance of the energy accumulator 14, such that an increase in a resistance of the energy accumulator 14 results in a decrease in the resistance of the variable resistor 26.

The variable resistor 26 may include a cooling system. For example, the variable resistor 26 may be in thermal communication with a water jacket for removing thermal energy from the variable resistor 26. Similarly, the variable resistor 26 may be in thermal communication with a thermoelectric material configured to generate electrical energy from thermal energy (e.g., received from the variable resistor 26). The electrical energy generated by the thermoelectric material may be passed to the energy accumulator 14.

Figure 2:
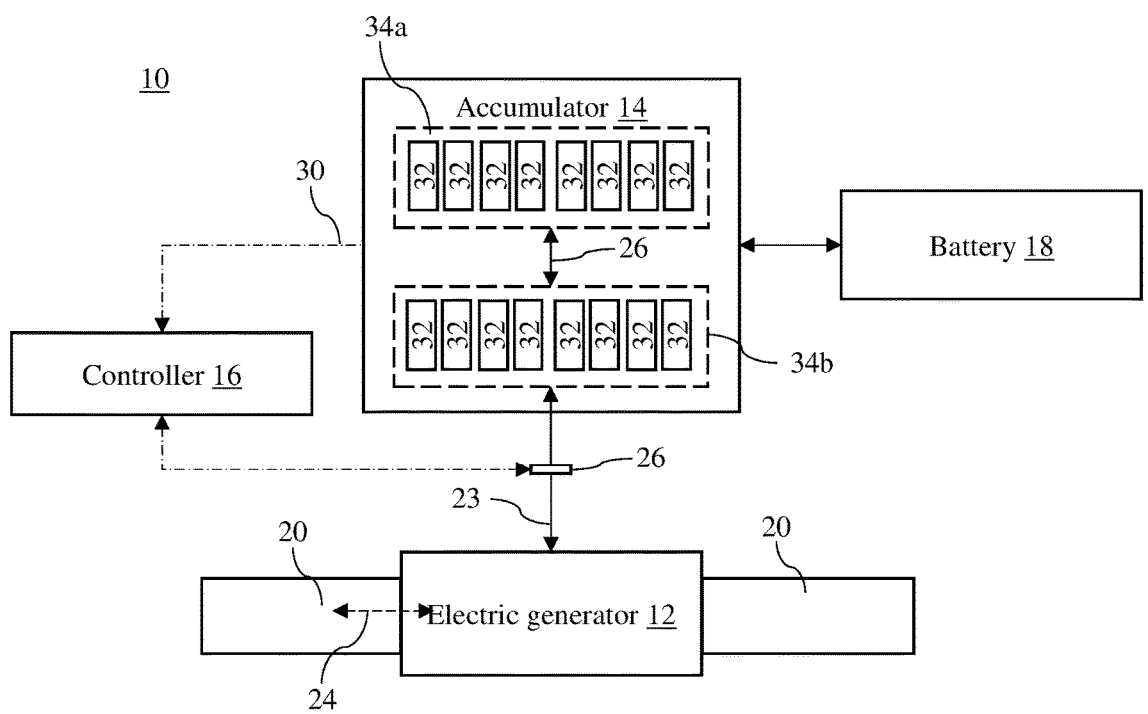
FIG. 2 illustrates a block diagram of an exemplary electric regenerative braking system including groups of ultracapacitors.
Figure 3:
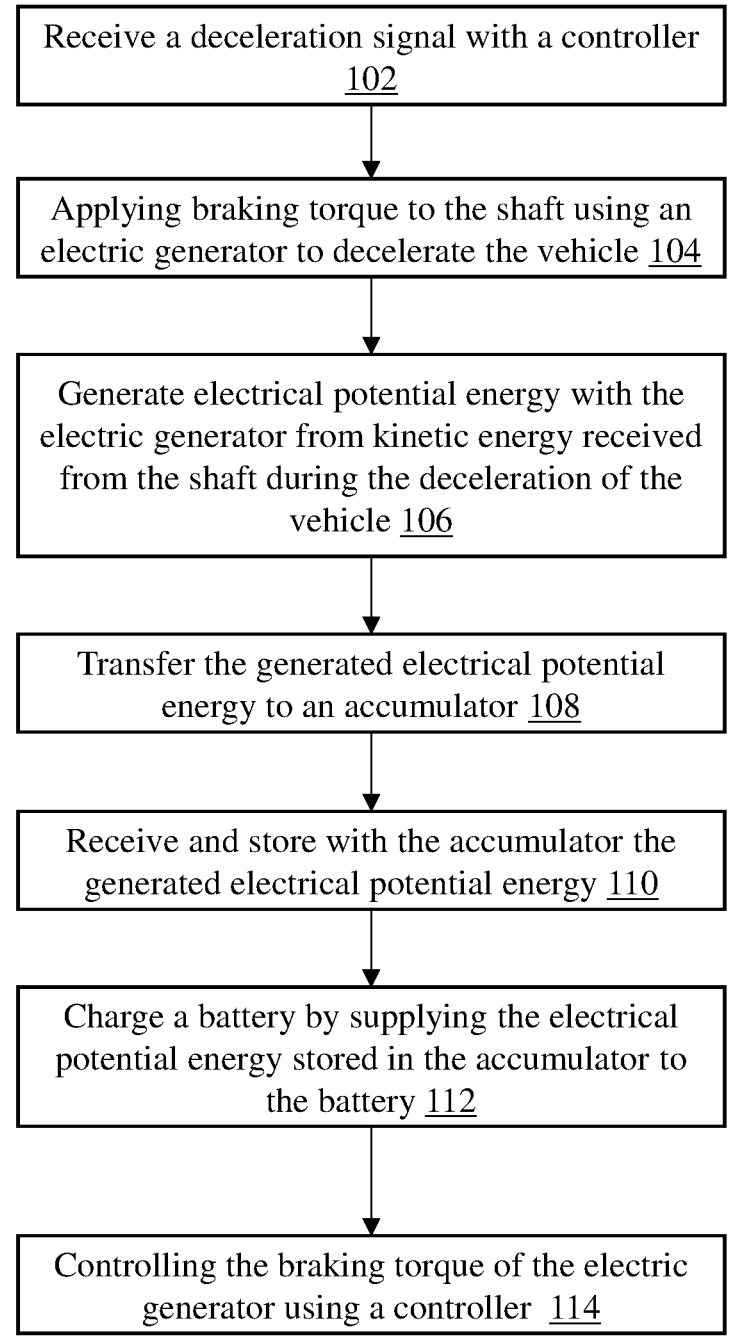
FIG. 3 is a flow diagram of an exemplary method for capturing kinetic energy as electrical potential energy during a braking event using an electric regenerative braking system by applying a braking torque to a shaft of a vehicle.

The energy accumulator 14 may include one or more ultracapacitors 32. The ultracapacitor(s) 32 may have a resistance that increases exponentially with an amount of stored electrical potential energy. In the embodiment shown in FIG. 2, the energy accumulator 14 includes a plurality of ultracapacitors 32 that are segmented into groups 34 including a first group of ultracapacitors 34a and a second group of ultracapacitors 34b. The groups of ultracapacitors 34 may sequentially receive (i.e., are electrically connected in series) the electrical potential energy 23 generated by the electric generator 12, such that the first group of ultracapacitors 34a receives and stores a predetermined electrical potential energy amount before the second group of ultracapacitors 34b receives the electrical potential energy 23 from the electric generator 12.

The energy accumulator 14 may be any device suitable for receiving and storing electrical potential energy. For example, the energy accumulator 14 (also referred to as an electric energy accumulator) may be an electric storage reservoir in which electrical potential energy is stored. As an example, the energy accumulator 14 may be one or more ultracapacitors 32. An ultracapacitor 32 (also referred to as a supercapacitor) may be defined as an electrical component capable of much more (e.g., one-hundred times) electrical charge quantity than a standard capacitor.

The controller 16 may determine the resistance of the energy accumulator in any suitable manner. For example, the controller 16 may receive a direct measurement of the electrical resistance from an electrical sensor or the resistance may be indirectly measured by measuring a stored electrical potential energy of the energy accumulator and a known relationship between stored electrical potential energy and resistance.

In one embodiment, the processor circuitry 28 controls the braking torque 24 of the electric generator 12 by modulating the resistance of the variable resistor 26 based on both the resistance of the energy accumulator 14 at the current time point and a current speed of the vehicle 22. For example, for a constant resistance of the energy accumulator 14, the resistance of the variable resistor 26 may decrease with vehicle speed. That is, as the speed of the vehicle decreases, the resistance experienced by the electric generator 12 may be decreased (e.g., by discharging the energy accumulator 14 resulting in a decreased resistance of the energy accumulator 14 and/or by lowering the resistance of the variable resistor 26). Similarly, at increased speeds, the resistance experienced by the electric generator 12 may be increased (e.g., by increasing the resistance of the variable resistor 26). As an example, the resistance of the variable resistor may be equal to difference between a predetermined constant and the resistance of the energy accumulator 14, multiplied by a weight factor that is based on (e.g., proportional to) the speed of the vehicle 22.

As described above, during a braking event the electric generator 12 may generate electrical potential energy at a rate exceeding a maximum charge rate of the battery 18. That is, during a braking event having a time duration, the energy accumulator 14 receives the electrical potential energy generated by the electric generator 12 over the time duration of the braking event. The amount of electrical potential energy generated over this time duration may be greater than the amount of electrical potential energy that the battery 18 is capable of receiving over this duration of time (i.e., the time duration of the braking event). For this reason, the energy accumulator 14 may charge the battery 18 over a time duration greater than the time duration of the braking event. That is, the energy accumulator 14 may act as a time buffer between the electric generator 12 and the battery 18, releasing to the battery 18 the electrical potential energy generated by the electric generator 12 over a duration of time longer than the duration of time taken to generate the electrical potential energy.

If electrical potential energy is provided to the battery 18 at too fast of a rate, a temperature of the battery 18 may increase. Additionally, battery 18 performance may degrade as temperature of the battery 18 increases. In one embodiment, the processor circuitry 28 controls routing of the electrical potential energy 23 stored in the energy accumulator 14 to the battery 18 based on a temperature of the battery 18. The processor circuitry 28 may route electrical potential energy 23 to the battery 18 such that an increase in the temperature of the battery 18 results in a decrease in the electrical potential energy routed to the battery 18. For example, the electrical potential energy routed to the battery may be decreased when the temperature of the battery is greater than a threshold temperature. As an example, an electrical potential energy routed to the battery may be maintained at a predetermined rate while the battery's temperature is below the threshold temperature. Upon the battery passing the threshold temperature, the processor circuitry 28 may decrease the rate that electrical potential energy is routed to the battery 18 (e.g., in proportion to the temperature of the battery 18). For example, the processor circuitry 28 may be configured to maintain or reduce the temperature of the battery 18 by decreasing the rate that electrical potential energy is routed to the battery 18. In one example, the processor circuitry 28 may stop routing electrical potential energy 23 to the battery 18 when the battery's temperature increases above a maximum threshold temperature.

The processor circuitry 28 may receive a current temperature of the battery 18 from a temperature sensor configured to measure a temperature of the battery 18. The temperature sensor may be any suitable device (e.g., contact or non-contact sensor) positioned to measure the temperature of the battery 18 and to report the measured temperature to the processor circuitry 28. Alternatively or additionally, the processor circuitry 28 may determine a temperature of the battery 18 based on some other measured property of the battery (e.g., electrical resistance, voltage, etc.).

The electric generator may have a capture mode and a drive mode. The electric generator 12 may act as a generator in the capture mode and as an electric motor in the drive mode. In the drive mode, the electric generator 12 may receive at least a portion of the stored electrical potential energy from the energy accumulator 14, generate kinetic energy from the received electrical potential energy, and transfer the generated kinetic energy to the shaft 20 of the vehicle 22. That is, in the drive mode the energy accumulator 14 may be used to provide electrical energy to the electric generator 12, such that the electric generator 12 generates kinetic energy. In the capture mode, the electric generator 12 may receive the kinetic energy from the shaft 20, generate electrical potential energy from the received kinetic energy, and transfer the generated electrical potential energy to the energy accumulator 14.

The controller 16 may transition the electric generator 12 between the capture mode and the drive mode by controlling a direction of flow of the electrical potential energy between the electric generator 12 and the energy accumulator 14. That is, in the capture mode, the controller 16 may cause the electrical potential energy to flow from the electric generator 12 to the energy accumulator 14. Similarly, in the drive mode, the controller 16 may cause the electrical potential energy to flow from the energy accumulator 14 to the electric generator 12. For example, the system 10 may include a switch 40 controlled by the controller 16 for regulating the direction of flow of the electrical potential energy between the electric generator 12 and the energy accumulator 14.

The controller 16 may also control routing of the electrical potential energy stored in the energy accumulator 14 between the battery 18 and the electric generator 12. For example, the processor circuitry 28 may control routing of the electrical potential energy stored in the energy accumulator 14 between the battery 18 and the electric generator 12 based on a received acceleration signal 52. For example, the acceleration signal 38 may be generated by a driver pushing down on an acceleration pedal.

In one embodiment, upon receiving an acceleration signal 38, the processor circuitry 28 determines a kinetic energy output of the electric generator 12 based on the received acceleration signal 38. For example, the processor circuitry 28 may determine that the electric generator 12 should be operated at a particular percentage (e.g., 50%, 80%, etc.) of its maximum power based on the received acceleration signal 38. The processor circuitry 28 may determine the kinetic energy output of the electric generator 12 (e.g., the operating characteristics) using a lookup table and the received acceleration signal 38.

Upon determining the kinetic energy output, the processor circuitry 12 may then determine an electrical power needed for the electric generator to generate the determined kinetic energy output. For example, the processor circuitry 28 may use a lookup table to determine the electrical power (e.g., the properties of the electrical potential energy such as watts per second) for meeting the determined kinetic energy output (e.g., the operating characteristics of the electric generator 12). The lookup table may use both the determined kinetic energy output and a current speed of the vehicle to determine properties of the electrical potential energy to provide to the electric generator 12 (e.g., less electrical power may be needed to meet the determined kinetic energy output at a higher rate of speed). When the stored electrical potential energy of the energy accumulator is greater than the determined electrical power, the processor circuitry may cause the energy accumulator 14 and/or battery 18 to route the determined electrical potential energy to the electric generator 12.

In one embodiment, the energy accumulator may route electrical potential energy simultaneously to the battery 18 and to the electric generator 12. For example, when the stored electrical potential energy of the energy accumulator 14 is greater than the determined electrical power to be supplied to the electric generator 12, the energy accumulator 14 may route the determined electrical potential energy to the electric generator 12, and also route a remainder of the stored electrical potential energy of the energy accumulator 14 to the battery 18.

In addition to the acceleration signal 38, the processor circuitry 28 may also receive a deceleration signal 42. The resistance of the variable resistor 26 may also be modulated by the controller 16 based on the received deceleration signal. For example, the resistance of the variable resistance 26 may be modified in proportion to the deceleration signal 42. As an example, the deceleration signal 42 may be generated by the driver pushing down on a brake pedal, with a stronger deceleration signal (e.g., higher magnitude) being generated when the driver pushes down harder on the brake pedal. The processor circuitry 28 may use a lookup table to determine the combined resistance of the variable resistor 26 and the resistance of the energy accumulator 14 based on the received deceleration signal 42. The processor circuitry 28 may then receive a measurement of the current resistance of the energy accumulator 14 and modify the resistance of the variable resistor 26, such that a sum of the received resistance of the energy accumulator and the resistance of the variable resistor 26 matches the value found in the lookup table.

While the electric generator 12 and the shaft 20 are shown as being directly connected in FIG. 1, there may be additional linkages (i.e., components) between the electric generator 12 and the shaft 20. That is, the electric generator 12 may directly interact with the shaft 20 (such that the torque 24 from the shaft 20 is directly received by the electric generator 12) or the torque 24 may be transferred to the electric generator 12 from the shaft 20 by a gearbox, transmission, or other mechanical linkage. In both examples, the torque 24 is (directly or indirectly) transferred to the shaft 20 and may be used to accelerate the vehicle 22. Similarly, the electric generator 12 may be directly connected to the energy accumulator 14 or there may additional components between the electric generator 12 and the energy accumulator 14.

The controller 16 may be any suitable device for controlling components of the system 10 (e.g., the variable resistor 26). For example, the controller 16 may be an electronic controller configured to operate through communication of electrical signals generated at the components and/or sensors monitoring operation of the components. In these and other embodiments, the controller 16 may interface with an engine of the vehicle via a controller area network (CAN) bus, which may enable communication of electrical signals from the components electrically coupled to the CAN bus. Additionally, the controller 16 may receive other signals via other communication interfaces, without limitation.

The controller 16 includes processor circuitry 28 such as a processor (e.g., CPU), programmable circuit, integrated circuit, memory and I/O circuits, an application specific integrated circuit, microcontroller, complex programmable logic device, other programmable circuits, or the like. The controller 16 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the circuitry. The circuitry may be communicatively coupled to the computer readable medium and network interface through a system bus, mother board, or using any other suitable structure known in the art.

The electric generator 12 may be any suitable electric device for generating kinetic (e.g., rotational) energy from electrical potential energy and for generating electrical potential energy from kinetic energy. For example, the electric generator 12 may utilize alternating current (AC) or direct current (DC). Similarly, the electric generator 12 may be asynchronous or synchronous.

Turning to FIG. 5, a method 100 is shown for capturing kinetic energy as electrical potential energy during a braking event using an electric regenerative braking system 10 by applying a braking torque to a shaft 20 of a vehicle 22. In step 102, the controller 16 receives a deceleration signal 42. In step 104, the electric generator 12 decelerates the vehicle during the braking event by applying the braking torque to the shaft. In step 106, the electric generator 12 generates electrical potential energy from the kinetic energy received from the shaft 20 during the deceleration of the vehicle 22.

In step 108, the electric generator 12 transfers the generated electrical potential energy to the energy accumulator 14. In step 110, the energy accumulator 14 receives and stores the electrical potential energy generated by the electric generator 12 during the braking event, such that an electrical potential energy of the energy accumulator 14 is increased.

In step 108, a signal is received to convert the captured energy to driving force to propel the vehicle. For example, the controller 16 may receive a signal from a driver of the vehicle 22 to accelerate the vehicle 22 (e.g., the signal may be generated by the driver pressing down on the accelerator). In step 110, the processor circuitry 28 of the controller 16 causes the electric generator 12 to transition to the drive mode. In step 112, the battery 18 by supplying the electrical potential energy stored in the energy accumulator 14 to the battery 18. In step 114, the controller 16 controls the braking torque 24 of the electric generator 12 by receiving the resistance of the energy accumulator 14 at a current time point and modulating a resistance of the variable resistor 26 based on the received resistance of the energy accumulator 14 at the current time point, such that the resistance of the variable resistor 26 is reduced as the resistance of the energy accumulator 14 increases.

The electric generator 12 may be coupled to the shaft 20 via a transmission (e.g., a throughput transmission). In some embodiments, the shaft 20 includes a first shaft section decoupled from a second shaft section. The transmission may be installed between the first shaft section and the second shaft section. The shaft 20 may also include one or more universal joints with gearing to transfer rotation of the first shaft section to the second shaft section.

The system 10 may additionally include a clutch for reducing torque load on the shaft 20 and/or the electric generator 12. For example, when the shaft 20 is rotating (e.g., when an engine of the vehicle is rotating the shaft 20), the clutch may be disengaged. When a braking event begins (e.g., when a driver presses on a brake pedal), the clutch may be engaged, enabling the shaft 20 to transfer rotational energy to the electric generator 12. Similarly, when the driver presses on an accelerator of the vehicle 22, the clutch may mechanically couple the electric generator 12 to the shaft 20, enabling the electric generator 12 (e.g., via the electrical potential energy supplied by the energy accumulator 14) to drive the shaft 20 by itself or in combination with an engine of the vehicle 20.

The controller 16 may receive a brake signal and a drive signal, as discussed above. The brake signal and the drive signal may include, but are not limited to foot pedals, levers, actuators, another control system providing electrical or mechanical input, etc. The brake signal and the drive signal are not necessarily of a common or similar type and may or may not be operated by a common operator.

The controller 16 may receive signals (also referred to as data) from one or more sensors. The sensors may be retrofit onto the electric generator 12, the shaft 20, the energy accumulator 14, or in any other suitable location for detecting operation of the system 10 and/or the vehicle 22. For instance, one or more of the sensors may indicate a position of a component, a change in position of the component, a rate of change of the component, etc.

The sensors may include sensors and instruments mounted to or otherwise monitoring the components in which the sensors are included. The controller 16 may adjust one or more settings and/or operational states in the components of the electric regenerative braking system 10 based on data measured by the sensors. For example, the controller 16 may receive rotational data from a tachometer monitoring rotational speed of the shaft 20. Some other examples of the sensors may include pressure transducers, displacement sensors, system enable switches, position sensors, global positioning system (GPS) sensors/receivers, speed sensors, other similar sensors, or any combination thereof.

Additionally or alternatively, the sensors may include levers, switches, and actuators. The physical action of the levers, switches, and actuators may indicate an operating condition of the engine. For example, a limit switch may be mounted near the accelerator and/or brake pedal. When a user operates the accelerator and/or brake pedal, motion of the accelerator and/or brake pedal may physically interfere with the limit switch indicating a given position of the accelerator and/or brake pedal. The levers, switches, and actuators may be mechanical, hydraulic, electric, pneumatic, etc.

In some embodiments, the controller 16 may use a standard communication protocol. In these and other embodiments, signals communicated from the sensors and/or signals accessed via the CAN bus 136 may be formatted according to the standard communication protocol. For example, the controller 16 may use the J1939 bus protocol. Accordingly, in this and other embodiments, the sensors such as the position sensors and/or the speed sensors may generate J1939 messages.

For example, the controller 16 may include a primary throttle subroutine calibrated to the position of the accelerator pedal and electrical potential energy stored in the energy accumulator 14. The position of the accelerator pedal may be controlled and/or monitored via an analog signal or a J1939 CAN Bus signal or another communication protocol.

In the primary throttle subroutine, a throttle signal, which controls energy supply to the electric generator 12 and/or other electric motors of the vehicle 22, may be adjusted to decrease an amount of electrical potential energy required to move the vehicle at a rate indicated by a position of the accelerator pedal from 100% to 0% based upon an amount of electrical potential energy stored in the energy accumulator 14 and/or battery 18.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An electric regenerative braking system for capturing kinetic energy as electrical potential energy during a braking event by applying a braking torque to a shaft of a vehicle, the system comprising:
    an electric generator mechanically connected to the shaft of the vehicle, wherein the electric generator is configured to:
        decelerate the vehicle during the braking event by applying the braking torque to the shaft; and
        generate electrical potential energy from kinetic energy received from the shaft during the braking event;
    an energy accumulator electrically connected to the electric generator and configured to receive and store the electrical potential energy generated by the electric generator during the braking event, such that an electrical potential energy is increased in the energy accumulator;
    wherein a resistance of the energy accumulator increases as the electrical potential energy stored by the energy accumulator increases;
    a battery electrically connected to the energy accumulator, wherein the energy accumulator is further configured to charge the battery using the stored electrical potential energy; and
    a controller including a variable resistor, and processor circuitry configured to:
        modulate a resistance of the variable resistor, wherein the braking torque of the electric generator is determined based on the resistance of the energy accumulator and the resistance of the variable resistor;
        receive the resistance of the energy accumulator at a current time point; and
        control the braking torque of the electric generator by modulating the resistance of the variable resistor based on the resistance of the energy accumulator at the current time point, such that the resistance of the variable resistor is reduced as the resistance of the energy accumulator increases.

2. The system of claim 1, wherein the energy accumulator includes one or more ultracapacitors having a resistance that increases exponentially with an amount of stored electrical potential energy.

3. The system of claim 2, wherein:
    the energy accumulator includes a plurality of ultracapacitors;
    the plurality of ultracapacitors are segmented into groups including a first group of ultracapacitors and a second group of ultracapacitors; and
    the groups of ultracapacitors sequentially receive the electrical potential energy generated by the electric generator, such that the first group of ultracapacitors receives and stores a predetermined electrical potential energy amount before the second group of ultracapacitors receives the electrical potential energy from the electric generator.

4. The system of claim 1, wherein the processor circuitry controls the braking torque of the electric generator by modulating the resistance of the variable resistor based on both the resistance of the energy accumulator at the current time point and a current speed of the vehicle.

5. The system of claim 1, wherein:
    during a braking event having a time duration, the energy accumulator receives the electrical potential energy generated by the electric generator charged over the time duration of the braking event; and
    the energy accumulator charges the battery over a time duration greater than the time duration of the braking event.

6. The system of claim 1, wherein the electric generator has a capture mode and a drive mode, wherein the electric generator is configured to act as a generator in the capture mode and as an electric motor in the drive mode, such that:
    in the drive mode, the electric generator receives at least a portion of the stored electrical potential energy from the energy accumulator, generates kinetic energy from the received electrical potential energy, and transfers the generated kinetic energy to the shaft of the vehicle; and in the capture mode, the electric generator receives the kinetic energy from the shaft, generates electrical potential energy from the received kinetic energy, and transfers the generated electrical potential energy to the energy accumulator.

7. The system of claim 6, wherein the processor circuitry is configured to control routing of the electrical potential energy stored in the energy accumulator between the battery and the electric generator.

8. The system of claim 7, wherein the processor circuitry controls routing of the electrical potential energy stored in the energy accumulator between the battery and the electric generator based on a received acceleration signal.

9. The system of claim 8, wherein the routing of the electrical potential energy by the processor circuitry includes:
   determining a kinetic energy output of the electric generator based on the received acceleration signal;
   determining an electrical power needed for the electric generator to generate the determined kinetic energy output; and
   when the stored electrical potential energy of the energy accumulator is greater than the determined electrical power, routing the determined electrical potential energy from the energy accumulator to the electric generator.

10. The system of claim 9 wherein, when the stored electrical potential energy of the energy accumulator is greater than the determined electrical power:
   routing the determined electrical potential energy from the energy accumulator to the electric generator; and
   routing a remainder of the stored electrical potential energy of the energy accumulator to the battery.

11. The system of claim 6, wherein the controller is configured to transition the electric generator between the capture mode and the drive mode by controlling a direction of flow of the electrical potential energy between the electric generator and the energy accumulator, such that:
   in the capture mode, the electrical potential energy flows from the electric generator to the energy accumulator; and
   in the drive mode, the electrical potential energy flows from the energy accumulator to the electric generator.

12. The system of claim 11, further comprising a switch configured to regulate the direction of flow of the electrical potential energy between the electric generator and the energy accumulator, wherein the controller is further configured to control the switch.

13. The system of claim 1, wherein the processor circuitry is configured to control routing of the electrical potential energy stored in the energy accumulator to the battery based on a temperature of the battery, such that an increase in the temperature of the battery results in a decrease in the electrical potential energy routed to the battery.

14. The system of claim 13, wherein the electrical potential energy routed to the battery is decreased when the temperature of the battery is greater than a threshold temperature.

15. The system of claim 1, wherein:
   wherein the processor circuitry is configured to receive a deceleration signal; and
   the resistance of the variable resistance is further modulated by the controller based on the received deceleration signal.

16. A method for capturing kinetic energy as electrical potential energy during a braking event using an electric regenerative braking system by applying a braking torque to a shaft of a vehicle, the method comprising:
   receiving a deceleration signal with a controller of the system;
   decelerate the vehicle during the braking event by applying the braking torque to the shaft using an electric generator of the system, wherein the electric generator is mechanically connected to the shaft of the vehicle;
   generating electrical potential energy from kinetic energy received from the shaft by the electric generator during the deceleration of the vehicle;
   the electric generator transferring the generated electrical potential energy to an energy accumulator of the system;
   receiving and storing the electrical potential energy generated by the electric generator with the energy accumulator during the braking event, such that an electrical potential energy of the energy accumulator is increased, wherein a resistance of the energy accumulator increases as the electrical potential energy stored by the energy accumulator increases;
   charging a battery of the system by supplying the electrical potential energy stored in the energy accumulator to the battery; and
   controlling the braking torque of the electric generator using a controller of the system by:
      receiving the resistance of the energy accumulator at a current time point with processor circuitry of the controller; and
      modulating with the processor circuitry a resistance of a variable resistor of the controller based on the received resistance of the energy accumulator at the current time point, such that the resistance of the variable resistor is reduced as the resistance of the energy accumulator increases.

17. The method of claim 16, wherein the braking torque of the electric generator is controlled by modulating the resistance of the variable resistor based on both the resistance of the energy accumulator at the current time point and a current speed of the vehicle.

18. The method of claim 16, wherein during a braking event having a time duration, the method further comprise:
   the energy accumulator receiving the electrical potential energy generated by the electric generator charged over the time duration of the braking event; and
   the energy accumulator charging the battery over a time duration greater than the time duration of the braking event.

19. The method of claim 16, wherein the electric generator has a capture mode and a drive mode, and the electric generator is configured to act as a generator in the capture mode and as an electric motor in the drive mode, the method further comprising:
   in the drive mode, the electric generator receiving at least a portion of the stored electrical potential energy from the energy accumulator, generating kinetic energy from the received electrical potential energy, and transferring the generated kinetic energy to the shaft of the vehicle; and
   in the capture mode, the electric generator receiving the kinetic energy from the shaft, the electric generator generating electrical potential energy from the received kinetic energy, the electric generator transferring the generated electrical potential energy to the energy accumulator.

20. The method of claim 16, further comprising:
   receiving an acceleration signal by the processor circuitry;

determining a kinetic energy output of the electric generator based on the received acceleration signal by the processor circuitry;

determining with the processor circuitry an electrical power needed for the electric generator to generate the determined kinetic energy output; and when the stored electrical potential energy of the energy accumulator is greater than the determined electrical power, the processor circuitry routing the determined electrical potential energy from the energy accumulator to the electric generator.

21. The method of claim 20 further comprising, when the stored electrical potential energy of the energy accumulator is greater than the determined electrical power:

the processor circuitry routing the determined electrical potential energy from the energy accumulator to the electric generator; and the processor circuitry routing a remainder of the stored electrical potential energy of the energy accumulator to the battery.

22. The method of claim 16, further comprising:

transitioning the electric generator between the capture mode and the drive mode with the controller by controlling a direction of flow of the electrical potential energy between the electric generator and the energy accumulator, such that:

in the capture mode, the electrical potential energy flows from the electric generator to the energy accumulator; and in the drive mode, the electrical potential energy flows from the energy accumulator to the electric generator.

23. The method of claim 16, further comprising:

the processor circuitry controlling routing of the electrical potential energy stored in the energy accumulator to the battery based on a temperature of the battery, such that an increase in the temperature of the battery results in a decrease in the electrical potential energy routed to the battery.

24. The method of claim 23, wherein the electrical potential energy routed to the battery is decreased when the temperature of the battery is greater than a threshold temperature.

25. The method of claim 16, further comprising:

receiving with the processor circuitry a deceleration signal; and further modulating with the controller the resistance of the variable resistance based on the received deceleration signal.

* * * * *